United States Patent [19]

Robinson et al.

[11] Patent Number: 4,936,018

[45] Date of Patent: Jun. 26, 1990

[54] FINISH GAUGE

[75] Inventors: Gerald R. Robinson, Perrysburg; Gary L. Moore, Swanton; Thomas A. Lucius, Toledo, all of Ohio

[73] Assignee: Owens-Illinois Plastic Products, Inc., Toledo, Ohio

[21] Appl. No.: 334,496

[22] Filed: Apr. 7, 1989

[51] Int. Cl.⁵ .......................... G01B 5/20; G01B 5/28
[52] U.S. Cl. ....................................................... 33/522
[58] Field of Search ................. 33/522, 549, 550, 551, 33/552, 832, 199 R, 199 B, 554; 408/26, 28; 209/529, 530, 531, 532

[56] References Cited

U.S. PATENT DOCUMENTS

| 1,940,783 | 12/1933 | Adams | 33/199 |
| 2,445,176 | 7/1948 | Hoffman | 33/522 |
| 2,508,251 | 5/1950 | Ingle | 33/522 |
| 3,073,034 | 1/1963 | Antoszewski | 33/522 |
| 4,135,306 | 1/1979 | Hannon | 33/522 |

FOREIGN PATENT DOCUMENTS 1202826  8/1970  United Kingdom .................. 33/554

Primary Examiner—William A. Cuchlinski, Jr.
Assistant Examiner—D. Price

[57] ABSTRACT

Apparatus and method of gauging the "saddle" of a container finish in which a test rig supports a bottle or container at an elevated position so the container can be rotated about the axis of its finish. The container is threaded into a finish ring. The finish ring is accurately supported for rotation in a horizontal plane with the feeler of an indicator engaging the top rim of the container during rotation. 360° rotation in both directions gives maximum and minimum readings that are registered and used to determine the differential or saddle of the container.

7 Claims, 4 Drawing Sheets

FINISH GAUGE

This invention relates to apparatus for checking the finish "saddle" of a container through a full 360° with the readings being capable of direct loading into a computer for storage and future reference.

BACKGROUND OF THE INVENTION

It has been the practice in the past to try to measure the finish of containers by locating the container on a rotating bottom supporting plate while locating a feeler gauge with its actuator contacting the rim of the container. This system would not result in consistent and reproduceable readings on containers that were produced under the same conditions for various reasons, such as, the lack of consistently formed containers with bottoms that were flat and at exact right angles with the vertical axis of the container. The limits that were required to be sure of acceptable containers would not necessarily provide assurance that the containers were being produced essentially identical on machines that were of the multiple section or multiple mold type. It is nearly essential that the glass container forming machines be of both the multiple section type, as well as of multiple cavity type in order to be economically competitive. It is necessary to be able to gauge the finish of the containers to be certain that they will be free of sealing defects that may occur because of too great a deviation in the maximum and minimum finish height of the container.

Other finish gauges would use the top of the finish as the datum from which orientation of the container would be subject and would result in inconsistent gauging of the "saddle" of the container finish.

It is an object of the present invention to provide a 360° inspection of the container finish "saddle" by the use of a finish ring to give a positive location.

It is a further object of the invention to use one thread of the container as the locating surface of the container rather than the top of the finish.

It is a still further object of the invention to provide a finish gauge which will accept different size finish rings, can check containers whether made of glass, plastic or metal, and where the data can be down loaded into a computer.

Other and further objects will be apparent from the following description taken in conjunction with the annexed sheets of drawing.

DETAILED DESCRIPTION OF THE DRAWINGS

Figure 1:
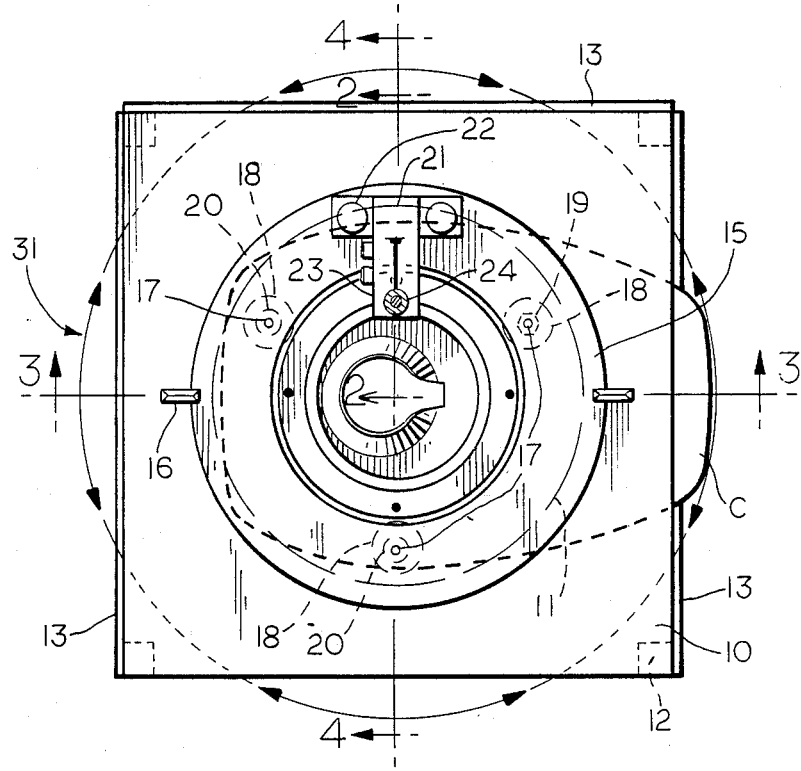
FIG. 1 is a top plan view of the gauging system of the invention with the indicator removed.
Figure 2:
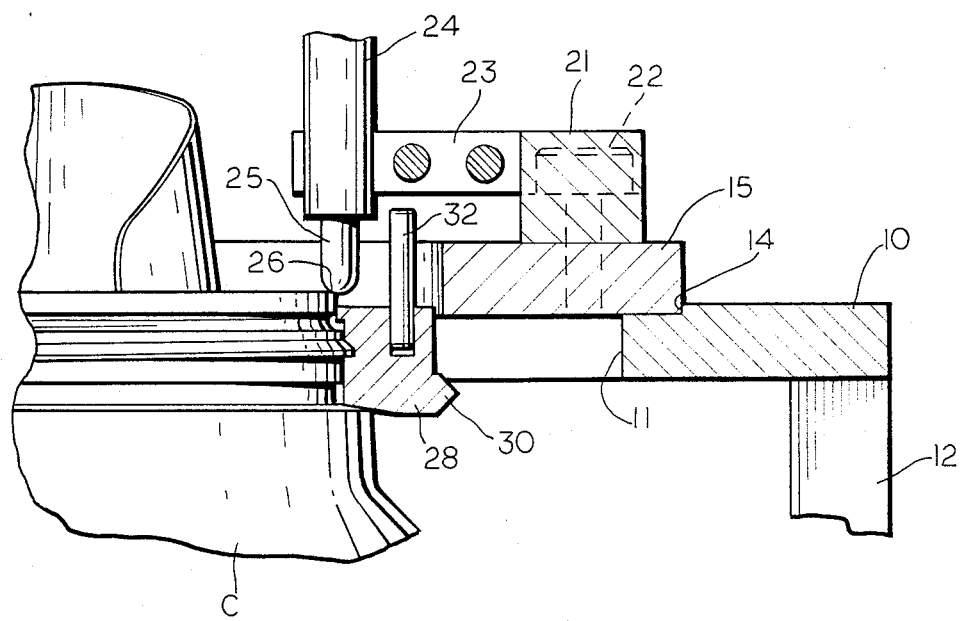
FIG. 2 is a cross-sectional view taken at line 2—2 of FIG. 1 at a scale of two times and with the container not in section.

The gauge system of the invention comprises a support base 10 that is a generally square, horizontal member with a circular opening 11 therethrough. Extending downwardly from each corner of the base 10 are legs 12. Three leg braces 13 extend between the legs adjacent the lower ends thereof. One side does not have a leg brace so as to provide easy access to the underside of the support base from the space between the legs.

The support base 10 is provided with circular step or recess 14 within which an annular support ring 15 is located. The support ring 15 is held down in contact with the support base by a pair of Carr-Lane quarter turn screws 16 that are threaded into the support base 10 with their heads overlying the edge of the support ring 15.

Figure 3:
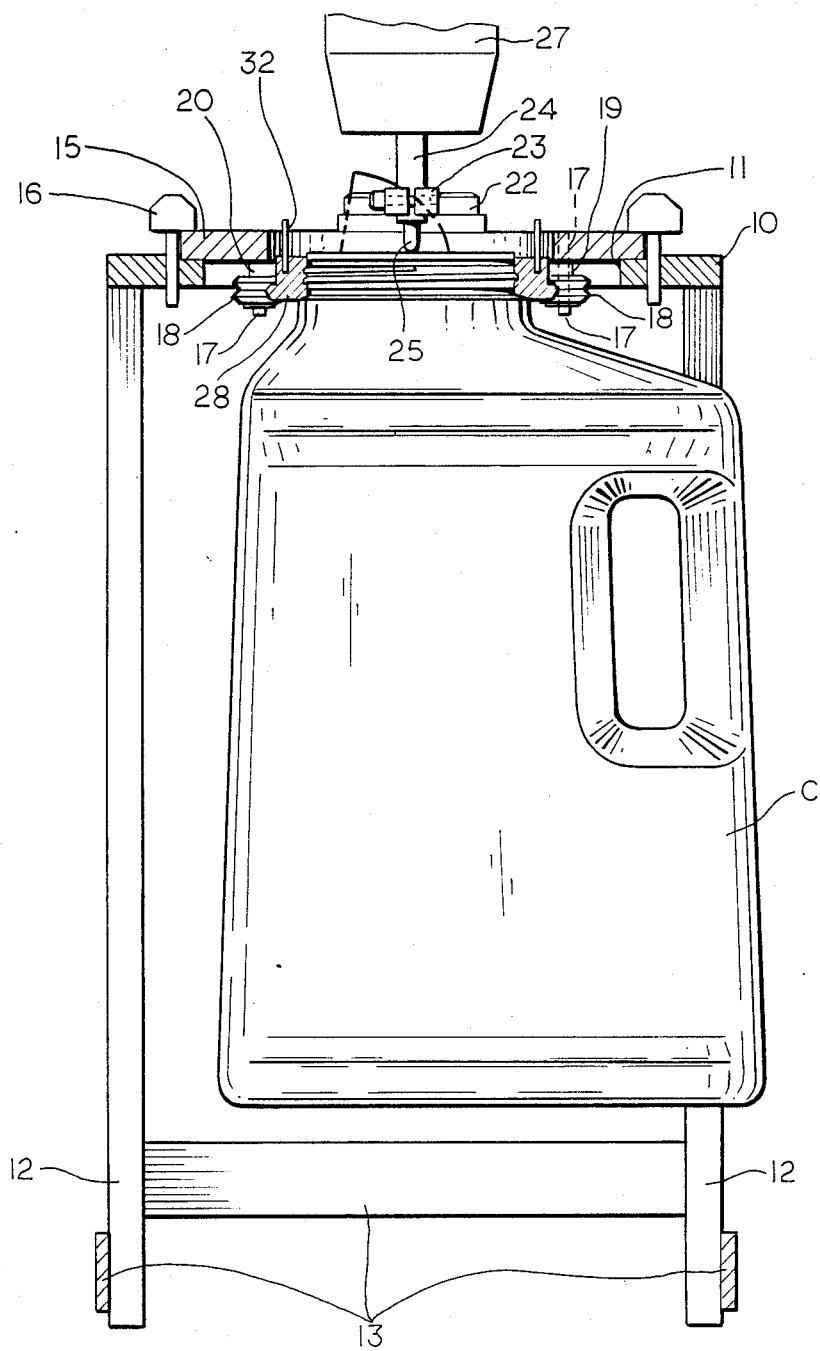
FIG. 3 is a cross-sectional view taken at line 3—3 of FIG. 1 with the container in full line.
Figure 4:
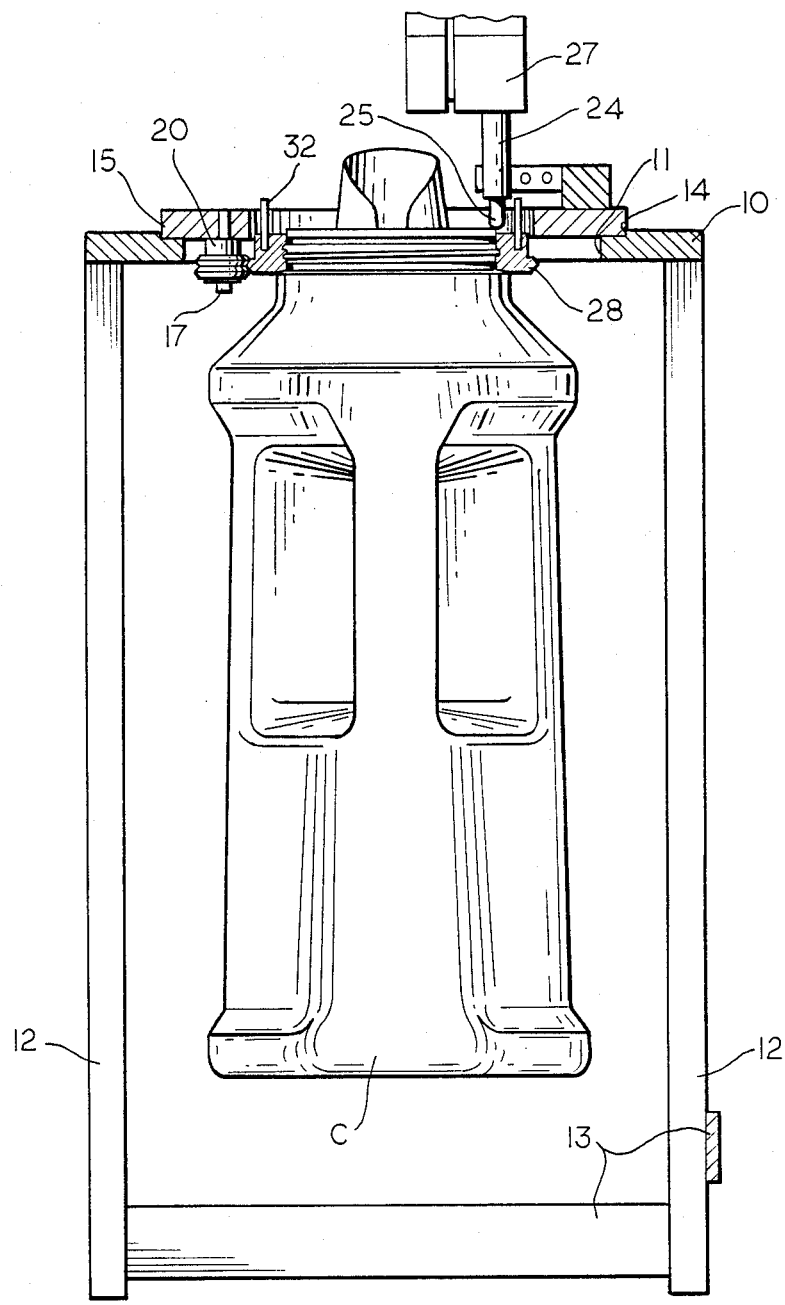
FIG. 4 is a cross-sectional view taken at line 4—4 of FIG. 1, with the container in full line.

The support ring 15, as shown in FIGS. 1, 3 and 4, has three cap head screws 17 threaded in holes arranged equispaced around the circumference thereof. Each cap head screw 17 supports a dual-vee guide wheel 18. The wheel 18 shown at the right in FIG. 3 has an interposed dual-vee adjustable bushing 19 between it and the ring 15 while the other guide wheels have dual-vee stationary bushings 20.

The foregoing description and drawing shows three guide wheels with one of the support bushings for the wheels being adjustable for the purpose of providing a set-up adjustment for the relative height and angle of a finish ring 28 supported thereby.

The ring 15 supports a gauge bracket 21 on its upper surface. The bracket 21 is fastened to the ring 15 by a pair of knurled thumb screws 22. The bracket 21 has a radially inward extending clamp arm 23 which is adapted to clamp the vertical stem 24 of a Mitutoyo 1DC DIGI-MATIC Indicator 27. The stem 24 is a housing for a feeler member 25 which telescopes therethrough with its lower end 26, which is rounded, adapted to contact the rim of the container finish that is being gauged. The stem 24 also supports the indicator 27.

Figure 5:
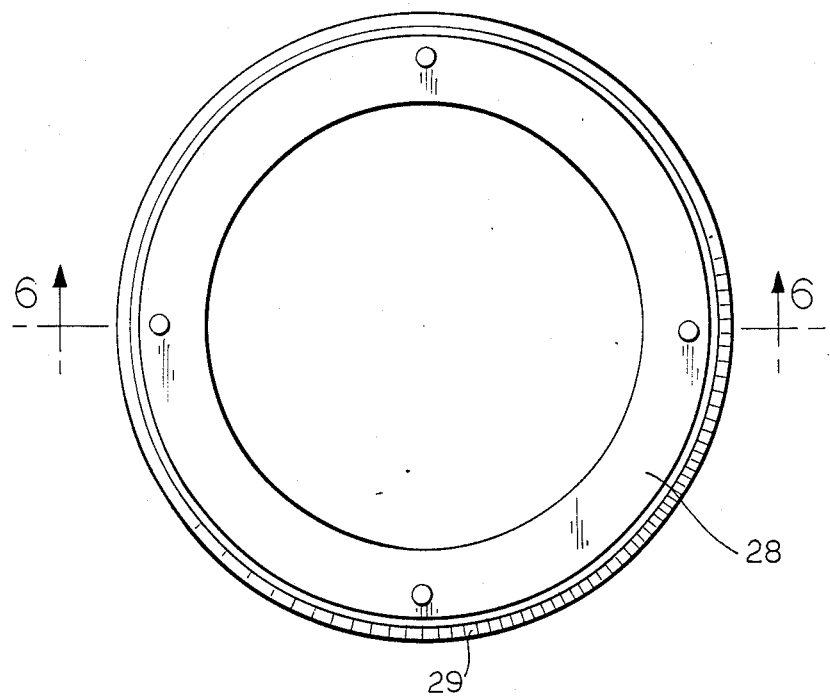
FIG. 5 is a top plan view of the finish ring of FIG. 1 on an enlarged scale; and, FIG. 6 is a cross-sectional view taken at line 6—6 of FIG. 5.
Figure 6:
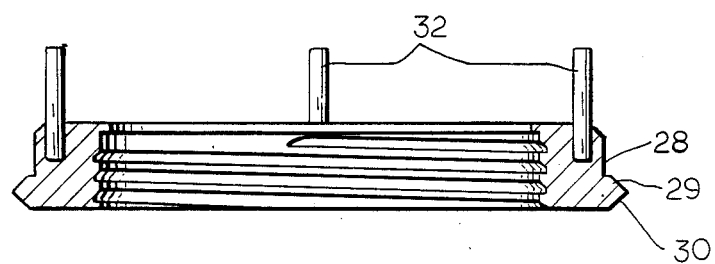

The dual-vee guide wheels 18 are adapted to receive a carefully machined finish ring 28. The ring 28 has a 90° included angle between beveled surfaces 29 and 30. The finish ring 28 is shown in detail in FIGS. 5 and 6 separate from the normal position that it would have when supporting the threaded finish of a continer C, as illustrated in FIGS. 1-4. The ring 28 receives the finish of the container and the container finish is threaded into the ring 28, either by holding the container while turning the ring by pins 32 or holding the ring while turning the container.

The container is threaded onto the finish ring until the container has "bottomed out'. Then the container is rotated through 360° about its vertical axis and the maximum reading is recorded. Next the container is rotated in the reverse direction through 360° to obtain the minimum reading. The gauge 27 will display both the maximum and minimum peak readings. This data is then supplied to a "data myte unit" which gives the total saddle from the maximum and minimum numbers that were provided by the indicator 27. This data may be stored on a floppy disc or other memory device for future reference.

The container C that is illustrated in the drawings is a detergent container with a pour spout and handle. Rotation of the container through 360° may be accomplished without interference with the legs 12, as illustrated by the dot-dash circle 31 on FIG. 1.

It is apparent that the gauge is suited for a wide variety of container sizes by providing a series of finish rings that have different thread diameters which are interchangeable. The indicator arm 23 may also be made adjustable to accommodate different diameters of the container finishes.

Having described the invention in detail, it will be apparent that various modifications may be resorted to without departing from the scope of the appended claims.

What is claimed:

1. A finish gauge for threaded containers comprising a generally horizontal support ring, means for supporting said ring at an elevated position, at least three equi-spaced guide wheels mounted circumferentially on said support ring for rotation about their vertical axes, an annular finish ring supported by said guide wheels for rotation about its central vertical axis and the central vertical axis of said support ring, internal threads in said finish ring for threadedly receiving the threaded finish of a container to be gauged with the upper rim of said container finish extending above said finish ring, an indicator mounted on said support ring, said indicator having a feeler member extending downward therefrom in engagement with the container rim surface, whereby relative movement of the container rim with respect to the support ring will result in the indicator registering variations in the height of the rim surface of the container.

2. The finish gauge of claim 1 wherein said guide wheels are formed with "V" notches in the rims thereof and said finish ring has a beveled outer edge that is received in said "V" notches.

3. The finish gauge of claim 2 wherein said guide wheels are three in number, two of said wheels are supported by stationary bushings and one of said bushings is vertically adjustable.

4. The finish gauge of claim 1 wherein said indicator is one which registers the maximum height of the feeler when the container is rotated in one direction and the minimum height of the feeler when rotated in the opposite direction.

5. The method of gauging the rim of containers that are mounted for rotation about the vertical axis of the finish, comprising the steps of threading the container finish in an internally threaded finish ring, supporting said finish ring for rotation about a vertical axis at an elevation that is greater than the container height, placing a feeler member of an indicating feeler gauge against the surface rim of the container finish, rotating the container and ring in one direction about the container axis through 360° and then rotating the container about the axis in the opposite direction through 360° registering the maximum height of the rim on the first rotation and registering the minimum height on the reverse rotation to provide an indication of the "saddle" of the container finish.

6. The method of claim 5 further including the step of entering the maximum and minimum readings in a computer memory for future reference.

7. The method of claim 5 further comprising the step of adjusting the support for the finish ring to assure that the finish ring will be rotated in a precise horizontal plane relative to the feeler member of the indicator.

* * * * *